United States Patent
Sheidler et al.

(10) Patent No.: US 8,375,926 B2
(45) Date of Patent: Feb. 19, 2013

(54) MOISTURE PURGING IN AN EGR SYSTEM

(75) Inventors: Alan Sheidler, Moline, IL (US); Craig Lohmann, Denver, IA (US)

(73) Assignee: Deere & Company, Moline, IL (US)

( * ) Notice: Subject to any disclaimer, the term of this patent is extended or adjusted under 35 U.S.C. 154(b) by 455 days.

(21) Appl. No.: 12/697,765

(22) Filed: Feb. 1, 2010

(65) Prior Publication Data

US 2011/0185991 A1 Aug. 4, 2011

(51) Int. Cl.
*F02B 47/08* (2006.01)

(52) U.S. Cl. ............... 123/568.12; 123/542; 123/559.1

(58) Field of Classification Search ........... 123/568.12, 123/542, 559.1, 563, 41.56, 41.57; 701/108; 60/605.2
See application file for complete search history.

(56) References Cited

U.S. PATENT DOCUMENTS

| | | | | |
|---|---|---|---|---|
| 5,617,726 A * | 4/1997 | Sheridan et al. | ............. | 60/605.2 |
| 6,038,860 A * | 3/2000 | Bailey | ............. | 60/605.2 |
| 6,367,256 B1 | 4/2002 | McKee | | |
| 7,131,263 B1 | 11/2006 | Styles | | |
| 7,168,250 B2 * | 1/2007 | Wei et al. | ............. | 60/605.2 |
| 7,305,976 B1 * | 12/2007 | Clarke | ............. | 123/568.12 |
| 7,313,918 B2 * | 1/2008 | Melchior | ............. | 60/605.2 |
| 7,757,678 B2 * | 7/2010 | Marsh et al. | ............. | 123/568.12 |
| 7,788,923 B2 * | 9/2010 | Rowells | ............. | 60/612 |
| 8,042,335 B2 * | 10/2011 | Pursifull et al. | ............. | 60/602 |
| 8,047,184 B2 * | 11/2011 | Styles et al. | ............. | 123/568.12 |
| 8,171,731 B2 * | 5/2012 | Joergl et al. | ............. | 60/605.2 |
| 2007/0245716 A1 | 10/2007 | Kardos et al. | | |
| 2007/0261400 A1 | 11/2007 | Digele et al. | | |
| 2009/0107141 A1 | 4/2009 | Chillar et al. | | |
| 2009/0217660 A1 * | 9/2009 | Ranini et al. | ............. | 60/599 |
| 2009/0249783 A1 * | 10/2009 | Gokhale et al. | ............. | 60/602 |
| 2010/0037608 A1 * | 2/2010 | Dierbeck | ............. | 60/605.2 |
| 2010/0107631 A1 * | 5/2010 | Pearson | ............. | 60/605.2 |
| 2011/0023842 A1 * | 2/2011 | Kurtz | ............. | 123/568.12 |
| 2011/0094482 A1 * | 4/2011 | Weber et al. | ............. | 123/568.12 |
| 2011/0296815 A1 * | 12/2011 | Pursifull et al. | ............. | 60/273 |

FOREIGN PATENT DOCUMENTS

| | | |
|---|---|---|
| CN | 101307736 A | 11/2008 |
| EP | 1 091 113 A2 | 4/2001 |
| WO | 2009058965 A1 | 5/2009 |

* cited by examiner

*Primary Examiner* — Hai Huynh
(74) *Attorney, Agent, or Firm* — Taylor IP, P.C.

(57) ABSTRACT

A two stage cooled EGR system for a turbocharged internal combustion engine with an intake air charge air cooler. The first EGR cooler is a liquid-to-air cooler and the second, low temperature EGR cooler, is an air-to-air cooler combining with the gas flow downstream of the intake air cooler. The system bypasses EGR flow through the low temperature EGR cooler during certain engine conditions such as low engine coolant temperature and a check valve allows a limited portion of un-cooled, pressurized intake air to be passed through the low temperature EGR cooler for scavenging of any residual moisture and ultimate consumption by the engine.

18 Claims, 2 Drawing Sheets

MOISTURE PURGING IN AN EGR SYSTEM

BACKGROUND OF THE INVENTION

1. Field of the Invention

The present invention relates to internal combustion engines, and, more specifically, to an exhaust gas recirculation (EGR) system for such engines.

2. Description of the Related Art

In an ever increasing effort that began more than 30 years ago, systems have been provided for internal combustion engines to recirculate a portion of the exhaust gas in order to reduce the combustion temperatures and, in turn, reduce the generation of oxides of nitrogen or NOx. Initial developments were undertaken for spark ignition engines but subsequent research has caused this technique to be applied to compression ignition, or diesel engines. In an effort to increase the density of the EGR gasses, and thus the impact on efficiency, cooled EGR has been proposed. Such a system enables a greater quantity of recirculated products of combustion without adversely affecting performance. However, systems of this type have problems, among those being the lowering of the EGR gas to the point moisture in the air condenses thus forming water particles. These water particles combine with the components in the combustion gasses to produce various acids that have an adverse effect on materials used for heat exchanges and air carrying conduits, as well as combustion chamber components.

In an effort to provide even greater quantities of EGR, additional coolers have been proposed to increase the gas density even more to minimize the effect on combustion efficiency. The additional cooling process, while providing a benefit, carries with it the occurrence of additional condensation and generation of water particles. It has been proposed in various systems to bypass the secondary cooling function during conditions when generation of water particles would occur to avoid the adverse problem of water ingestion in uncontrolled amounts into the combustion cylinders. However, these systems fail to address the problem of moisture that has collected in the heat exchangers.

Therefore, what is needed in the art is an EGR system in which the moisture in heat exchangers for such systems is effectively purged without adverse impact on the engine.

SUMMARY OF THE INVENTION

In one form, the invention is an exhaust gas recirculation (EGR) system for an air breathing, fuel consuming turbocharged internal combustion engine (IC) engine producing a work output and having products of combustion, said system having a conduit for delivering intake air from the turbocharger to the IC engine for combustion, and a heat exchanger interposed in the inlet air conduit for cooling air delivered to the IC engine. An EGR conduit receives a controlled portion of the products of combustion from the IC engine and selectively introduces the products of combustion into the intake air conduit. At least one heat exchanger is interposed in the EGR conduit for reducing the temperature of products of combustion passing to the intake air conduit. A first valve is responsive to a signal input for bypassing flow around the at least one heat exchanger during predetermined engine conditions, and a second valve responsive to the bypass flow condition delivers air from a point upstream of said charge air cooler to the at least one heat exchanger for purging moisture from the heat exchanger.

In another form, the invention includes a power system with an air breathing, fuel consuming internal combustion engine producing a work output with products of combustion. A fuel system supplies fuel to the IC engine for combustion. A turbocharger has a turbine for receiving products of combustion and a compressor for pressurizing air for delivery to the IC engine for combustion. A conduit delivers intake air from the turbocharger compressor to the IC engine for combustion. A heat exchanger interposed in the intake air conduit cools air delivered to the IC engine. An exhaust conduit extends from the IC engine to the turbine for said turbocharger and an exhaust gas recirculation (EGR) conduit is connected to the exhaust conduit for receiving a controlled portion of the products of combustion from said IC engine and is connected to the intake conduit for selectively introducing the products of combustion into the intake air conduit. At least one heat exchanger is interposed in the EGR conduit for reducing the temperature of products of combustion passing to the intake air conduit. A first valve is responsive to a signal input for bypassing flow around said at least one heat exchanger during predetermined engine conditions and a second valve responsive to the bypass flow condition delivers air from a point upstream of the intake air cooler to said at least one heat exchanger for purging moisture from said heat exchanger.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
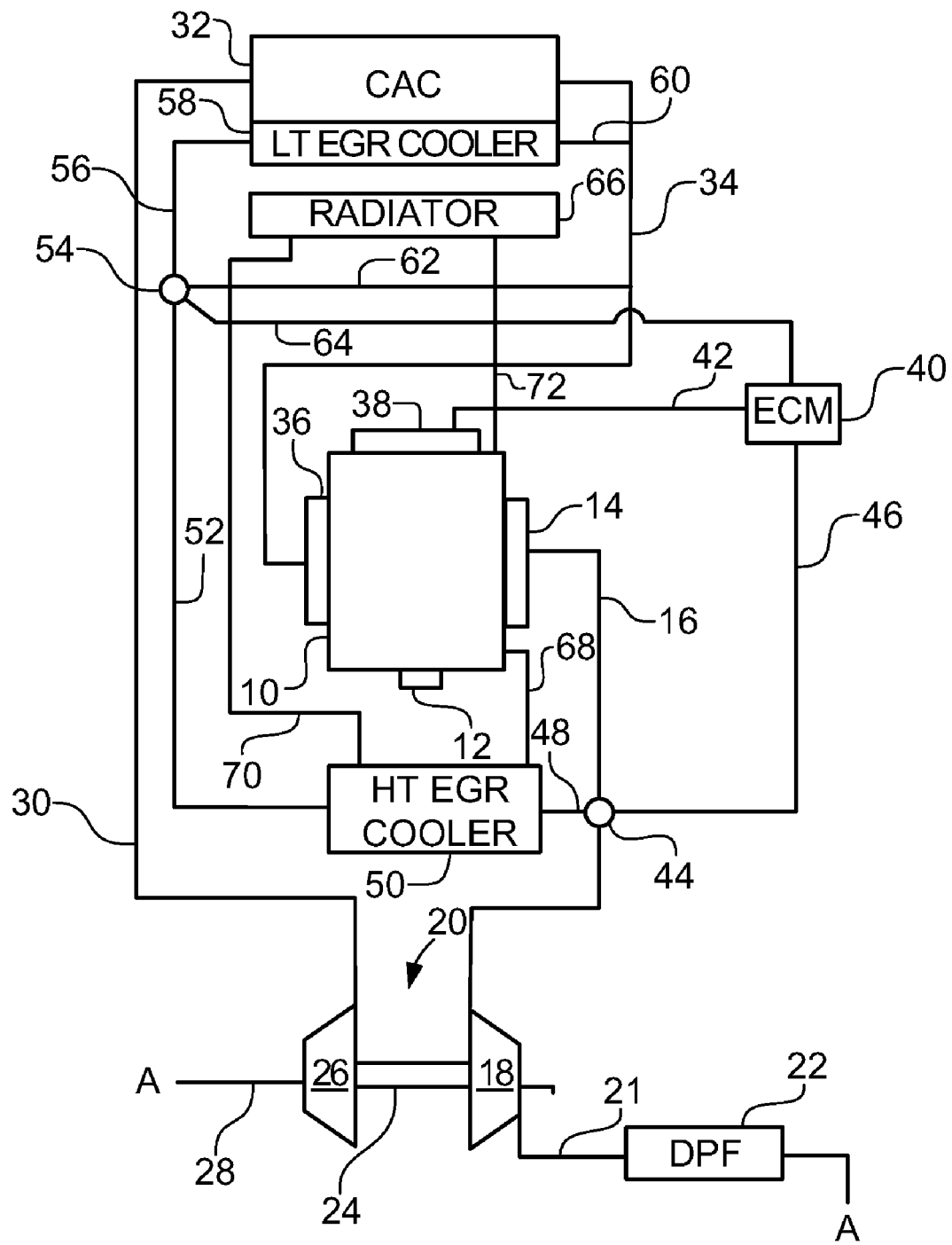
FIG. 1 shows a schematic view of an internal combustion engine system employing an EGR system embodying the present invention.

Referring now to the drawings, and more particularly to FIG. 1, there is shown an internal combustion engine 10 which is an air breathing, fuel consuming engine providing a rotary output through shaft 12. Engine 10 may be of the compression engine, spark ignition type or a combination thereof. In any of these cases, the products of combustion are discharged through an exhaust manifold 14 into an exhaust conduit 16 leading to the turbine 18 of a turbocharger 20. The discharge from turbine 18 extends through a conduit 21 which may include a diesel particulate filter 22 before leading to ambient A. It should be noted that the diesel particulate filter 22 may be employed at any point in the exhaust system including a position upstream of the turbine 18.

Turbine 18 provides a rotary output through a shaft 24 to a compressor 26 that receives air from ambient A through an inlet conduit 28. Typically, such air is filtered in an appropriate fashion. The air pressurized by compressor 26 extends through an intake air conduit 30 past a charge air cooler (CAC), or a intake air heat exchanger 32 to a second intake air conduit 34 leading to an intake manifold 36 for engine 10. The function of the charge air cooler 32 is to decrease the temperature of the air flowing therethrough and thus increase its density to enable a greater power output from engine 10.

Engine 10 receives fuel from a fuel system 38 to provide fuel in predetermined amounts at predetermined intervals in the operating cycle of the engine to provide controlled power from the engine 10. Fuel system 38 receives control inputs from an electronic control module (ECM) 40 via signal line 42. It should be noted that the ECM 40 receives engine operating parameter inputs from multiple locations on the engine 10 and total system to provide precise control of fuel. These connections have been omitted to simplify the understanding of the present invention.

As noted above, emissions controls have prompted the use of exhaust gas recirculation (EGR) to reduce the temperature of the products of combustion and to accordingly reduce the production of oxides of nitrogen. Such a system is shown by a valve 44 interposed in the exhaust conduit 16 and controlled by signal line 46 from ECM 40 to provide controlled amounts of the products of combustion, or exhaust gas, through EGR conduit 48. EGR conduit 48 leads to a high temperature EGR cooler 60 and then to a second EGR conduit 52 to a bypass valve 54. One fluid output from bypass valve 54 passes through conduit 56 to a low temperature EGR cooler 58 and, finally, through conduit 60 to fluidly connect with conduit 34 leading to the intake manifold 36. Valve 54 selectively directs flow through conduit 56 in one position and through a conduit 62 in a second position to bypass the low temperature EGR cooler 58 and direct the EGR flow to intake air conduit 34. Bypass valve 54 receives a signal input from ECM 40 via signal line 64 to bypass flow when around the low temperature EGR cooler when engine conditions are such that excessive moisture will be generated due to the cooling of the EGR flow. Typically, this, among other conditions may be when the engine coolant temperature is at a low level.

As illustrated, the engine 10 is a liquid cooled engine and requires a radiator 66 positioned generally in the ambient air flow passing through the charge air cooler and the low temperature EGR cooler. Radiator 66 is an air-to-liquid heat exchanger and includes a coolant flow path internal to the engine 10 and which passes through a coolant conduit 68, through the high temperature EGR cooler 50, and through coolant conduit 70 to radiator 66 and returns to the engine 10 via coolant conduit 72. A liquid coolant pump (not shown) provides circulation of the liquid coolant. Thus, the high temperature EGR cooler 50 is a liquid-to-air cooler and the low temperature EGR cooler 58 is an air-to-air cooler, as is the charge air cooler 32. The charge air cooler 32 and low temperature EGR cooler are air-to-air coolers because they enable the heat sink for the thermal dynamic heat transfer to be ambient air which is significantly lower than the engine coolant temperature found in the liquid control circuit for engine 10. By utilizing an air-to-air low temperature EGR cooler, EGR percentages may be significantly increased to provide a beneficial effect on the emissions generated by the engine. However, with the second stage of EGR cooling, the combustion products from the engine passing through the exhaust conduit 16 have moisture and the subsequent cooling reduces the temperature so that water condenses out of the air flow stream. This water combines with other products of combustion to have an adverse effect on the materials commonly used in the intake and combustion chamber of engines. The bypass valve 54 is provided to direct flow around the low temperature EGR cooler 58 so as to avoid the occurrence of condensation of moisture as stated above. However, with existing systems, there may be residual moisture within the low temperature EGR cooler which can pass in an uncontrolled manner to the inlet conduit 34.

Figure 2:
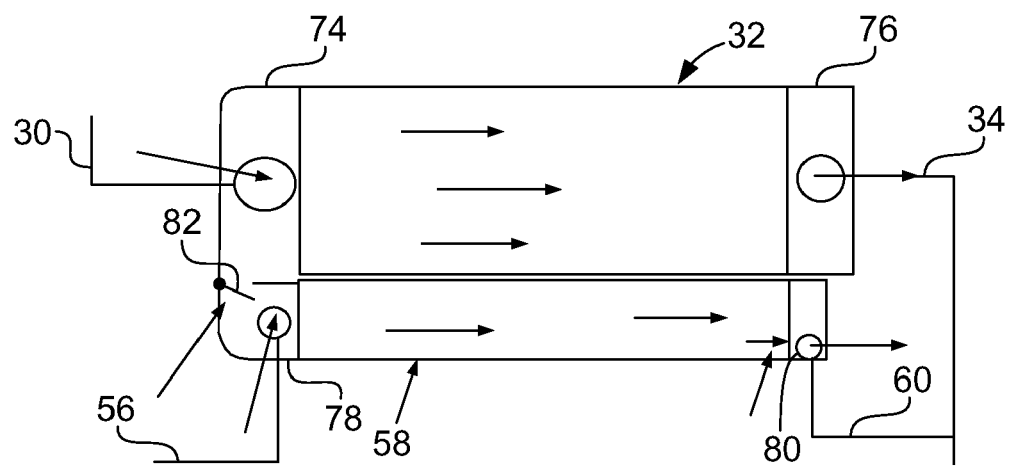
FIG. 2 is a view of a portion of the engine system of FIG. 1 and, FIG. 3 is an alternative view of the portion of the engine system shown in FIG. 2.
Figure 3:
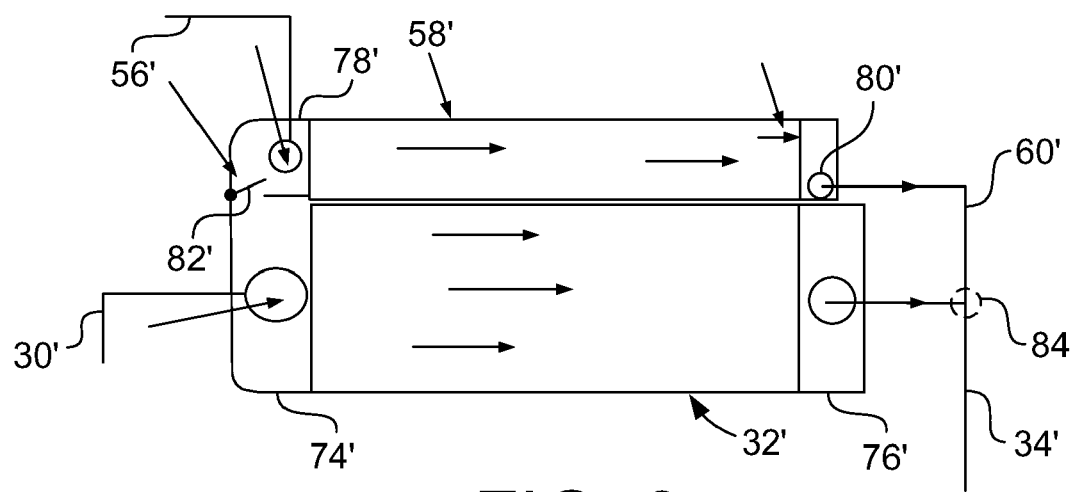

In accordance with the present invention, the charge air cooler 32 and low temperature EGR cooler 58 illustrated in FIGS. 2 and 3 minimize, if not eliminate, the adverse accumulation of moisture. The charge air cooler 32 has an inlet end 74 connected to intake air conduit 30 and an outlet end 76 connected to intake air conduit 34. Charge air cooler 32 is an air-to-air heat exchanger and includes flow passages (not shown) for providing heat exchange through the surface of internal flow directing passages to provide the cooling function. The low temperature after cooler 58 likewise has an inlet end 78 connected to EGR conduit 56 and an outlet 80 connected to conduit 60 at a low point in the EGR cooler 58 to permit any moisture to pass to conduit 60. The low temperature EGR cooler 58 has similarly configured passages to provide heat exchange flow. As illustrated, the charge air cooler 32 and low temperature EGR cooler 58 are contiguous with the charger cooler 32 being higher than the low temperature EGR cooler 58. A valve 82 interconnects the inlet end 74 of charge air cooler 32 to the inlet end 78 of low temperature EGR cooler 58. The inlet end 74 is upstream of the internal passages in charge air cooler 32 and is thus upstream of charge air cooler, and is exposed to the pressures and temperatures from the outlet of the compressor 28. Valve 82 operates on a pressure differential so that higher pressure in inlet end 74 than inlet 78 causes gas flow from a point upstream of the charge air cooler through the low temperature EGR cooler 58. As illustrated, valve 82 is a check valve only permitting flow from end 74 to end 78 so that any moisture generated within the low temperature EGR cooler 58 would not pass to the charge air cooler 32. Valve 82 permits a flow of air from a point upstream of the charge air cooler through the low temperature EGR cooler to purge it of any accumulated moisture. The air upstream of the charger cooler 32 is at a high temperature and passing it through the low temperature EGR cooler 58 evaporates and carries with it any accumulated moisture. Since the charge air cooler and the low temperature after cooler are contiguous and connected by the one way flow of valve 82, moisture does not flow from the low temperature cooler 58 into the charge air cooler 32. As such, the charge air cooler 32 can continue to be made of materials optimized for charge air cooling without the need for special selection to resist the effects of acids generated with moisture in the EGR stream.

The orientation of the charge air cooler 32 and low temperature EGR cooler 58 shown in FIG. 2 is that the charge air cooler 32 is on top. FIG. 3 shows the reverse orientation with duplicate numbers designated with a prime superscript. Thus, charge air cooler 32' is below low temperature EGR cooler 58'. The valve 82' permits only one way flow from the charge air cooler end 74' to the low temperature EGR cooler end 78'. The outlet 80' connects to conduit 60' at a low point in EGR cooler 58'. The advantage of this orientation is that the moisture droplets in the low temperature EGR cooler 58' fall by gravity into the higher velocity airstream from the charge air cooler 32' are entrained in the airflow in conduit 34' as a fine mist. In order to facilitate the entrainment, a mixer such as a nozzle 84, shown in dashed lines, may be incorporated into the system.

The above arrangements have the beneficial effect of utilizing a simple differential pressure check valve between the charge air cooler and the low temperature EGR cooler to provide effective purging of moisture from the low temperature EGR cooler without an elaborate control mechanism. The existing control mechanism to initiate bypass flow around the low temperature charge air cooler is retained but the added benefit is an effective purging of the low temperature charge air cooler without providing puddles of moisture in the main flow to the engine that could cause intermittent slugs of moisture to be ingested by the engine.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An exhaust gas recirculation (EGR) system for an air breathing, fuel-consuming, turbocharged internal combustion (IC) engine producing a work output with products of combustion, said system comprising:
   a conduit for delivering intake air from the turbocharger to the IC engine for combustion;
   a heat exchanger interposed in said intake air conduit for cooling air delivered to the IC engine;
   an EGR conduit for receiving a controlled portion of the products of combustion from the IC engine and selectively introducing the products of combustion into the intake air conduit;
   at least one heat exchanger interposed in said EGR conduit for reducing the temperature of products of combustion passing to the intake air conduit wherein the intake air heat exchanger and said at least one EGR heat exchanger are contiguous with one another;
   a first valve responsive to a signal for bypassing flow around said at least one heat exchanger during predetermined engine conditions; and
   a second valve responsive to said bypass flow condition for delivering air from a point upstream of said intake air cooler to said at least one heat exchanger for purging moisture from said heat exchanger, wherein said second valve permits flow only from the point upstream of said intake air cooler to said at least one EGR cooler.

2. The system of claim 1, wherein said second valve is a pressure responsive valve for permitting flow when the air upstream of said intake air cooler is higher than the pressure in said at least one heat exchanger.

3. The system of claim 1 having a pair of EGR coolers, one of which is interposed in said EGR conduit downstream from said other EGR cooler and wherein said first valve is responsive to bypass flow around said second EGR heat exchanger.

4. The EGR system of claim 3, wherein said first EGR cooler is a liquid-to-air cooler and said second EGR cooler is an air-to-air heat exchanger.

5. The EGR system of claim 1, wherein said engine is cooled by a liquid coolant and said first valve is responsive to engine coolant temperature to bypass flow around said at least one EGR heat exchanger when engine coolant temperature is below a predetermined level.

6. The EGR system of claim 1, wherein the intake air conduit is connected to the low temperature EGR cooler at a low point thereon.

7. The EGR system of claim 6 wherein said intake air heat exchanger is on top of the EGR heat exchanger.

8. The EGR system of claim 6 wherein said EGR heat exchanger is on top of the intake air heat exchanger so that moisture droplets in the EGR heat exchanger flow by gravity into the airstream downstream of the intake air heat exchanger.

9. The EGR system of claim 8 further including a mixer at the point at which the flow from said at least one EGR heat exchanger connects with the flow from the intake air heat exchanger.

10. A power system comprising:
    an air breathing, fuel consuming internal combustion (IC) engine producing a work output with products of combustion;
    a fuel system for supplying fuel to said IC engine in order to produce combustion;
    a turbocharger having a turbine for receiving products of combustion and a compressor for pressurizing air for delivery to said IC engine for combustion;
    a conduit for delivering intake air from the turbocharger to the IC engine for combustion;
    a heat exchanger interposed in said intake air conduit for cooling air delivered to the IC engine;
    an exhaust conduit extending from said IC engine to the turbine for said turbocharger;
    an exhaust gas recirculation (EGR) conduit connected to said exhaust conduit for receiving a controlled portion of the products of combustion from said IC engine and connected to said intake air conduit for selectively introducing the products of combustion into the intake air conduit wherein the intake air heat exchanger and said at least one EGR heat exchanger are contiguous with one another;
    at least one heat exchanger interposed in said EGR conduit for reducing the temperature of products of combustion passing to the intake air conduit;
    a first valve responsive to a signal input for bypassing flow around said at least one heat exchanger during predetermined engine conditions; and
    a second valve responsive to said bypass flow condition for delivering air from a point upstream of said intake air cooler to said at least one heat exchanger for purging moisture from said at least one (EGR) heat exchanger, wherein said second valve permits flow only from the point upstream of said intake air cooler through said at least one EGR cooler.

11. The power system of claim 10 wherein said second valve is a pressure responsive valve for permitting flow when the air upstream of said intake air cooler is higher than the pressure in said at least one heat exchanger.

12. The power system of claim 10 having a pair of EGR coolers, one of which is interposed in said EGR conduit downstream from said other EGR cooler and wherein said first valve is responsive to bypass flow around said second EGR heat exchanger.

13. The power system of claim 12, wherein said first EGR cooler is a liquid-to-air cooler and said second EGR cooler is an air-to-air heat exchanger.

14. The power system of claim 10, wherein said first valve is responsive to engine coolant temperature to bypass flow around said at least one EGR heat exchanger when said engine coolant temperature is below a predetermined level.

15. The power system of claim 10, wherein the intake air conduit is connected to the low temperature EGR cooler at a low point thereon.

16. The power system of claim 15, wherein the intake air heat exchanger is positioned on top of said at least one EGR heat exchanger.

17. The power system of claim 15 wherein said EGR heat exchanger is on top of the intake air heat exchanger so that moisture droplets in the EGR heat exchanger flow by gravity into the airstream downstream of the intake air heat exchanger.

18. The power system of claim 17 further including a mixer at the point at which the flow from said at least one EGR heat exchanger connects with the flow from the intake air heat exchanger.

* * * * *